(12) United States Patent
Lai et al.

(10) Patent No.: US 12,399,525 B1
(45) Date of Patent: Aug. 26, 2025

(54) NETWORK DEVICE AND TIME SYNCHRONIZATION METHOD THEREOF

(71) Applicant: Moxa Inc., New Taipei (TW)

(72) Inventors: Chien-Yu Lai, New Taipei (TW); Po-Hung Lin, New Taipei (TW)

(73) Assignee: Moxa Inc., New Taipei (TW)

( * ) Notice: Subject to any disclaimer, the term of this patent is extended or adjusted under 35 U.S.C. 154(b) by 66 days.

(21) Appl. No.: 18/587,920

(22) Filed: Feb. 26, 2024

(51) Int. Cl.
*G06F 1/12* (2006.01)

(52) U.S. Cl.
CPC ..................................... *G06F 1/12* (2013.01)

(58) Field of Classification Search
CPC .................. G06F 1/32; G06F 1/12; G06F 9/44
See application file for complete search history.

(56) References Cited

U.S. PATENT DOCUMENTS

2013/0080816 A1* 3/2013 Johnson ................. G06F 1/3206
713/401
2024/0320012 A1* 9/2024 Zhang ..................... G06F 9/441

FOREIGN PATENT DOCUMENTS

CN 111585862 A 8/2020

OTHER PUBLICATIONS

Mohamed Seliem et al., Software-Defined Time Sensitive Networks (SD-TSN) for Industrial Automation, 14th IEEE International Conference on Computational Intelligence and Communication Networks, 2022, p. 626-632, XP034272713 ,2022.
Zheng Yang et al., CaaS: Enabling Control-as-a-Service for Time-Sensitive Networking, IEEE INFOCOM 2023—IEEE Conference on Computer Communications, 2023, p. 1-10, XP034412485 ,2023.

* cited by examiner

*Primary Examiner* — Keshab R Pandey
(74) *Attorney, Agent, or Firm* — Winston Hsu

(57) ABSTRACT

A network device for industrial control includes at least one processor, configured to operate a first operating system (OS) to process data forwarding with TSN standards and operate a second operating system to operate with an industrial protocol to process industrial control; and a communication protocol processing module, coupled to the at least one processor, configured to process network traffic of the first operating system and the second operating system according to a synchronized time. The first operating system and the second operating system perform time synchronization through a time message to obtain the synchronized time.

16 Claims, 8 Drawing Sheets

NETWORK DEVICE AND TIME SYNCHRONIZATION METHOD THEREOF

BACKGROUND OF THE INVENTION

1. Field of the Invention

The present invention relates to a network device and a time synchronization method thereof, and more particularly, to a network device with multiple operating systems and a time synchronization method thereof for industrial control networks.

2. Description of the Prior Art

Controllers in industrial control networks such as PLCs (Programmable Logic Controllers) generally use specific industrial protocols, such as EtherCAT (Ethernet for Control Automation Technology), CC-Link IE (Control and Communication Link using Industrial Ethernet), PROFINET (Process Field Network), EtherNet/IP (Ethernet/Industrial Protocol), to monitor, control, or collect data from the industrial equipment. On the other hand, the controllers need to connect to switches complying with time-sensitive networking (TSN) standards so as to exchange information with other LANs or Information Technology (IT) networks.

In this situation, the switches need to be placed in the center of each field, far away from the industrial equipment, and are hard to obtain relevant information about the industrial equipment controlled by the connected controllers. Therefore, there is a pressing need for further improvements.

SUMMARY OF THE INVENTION

Therefore, the present invention aims to provide a network device and a time synchronization method thereof for industrial control, which integrate both functions of network switch and industrial controller into a monolithic device so as to improve the disadvantages of conventional techniques.

An embodiment of the present invention discloses a network device for industrial control. The network device includes at least one processor and a communication protocol processing module. The at least one processor is configured to operate a first operating system (OS) to process data forwarding with TSN standards and operate a second operating system to operate with an industrial protocol to process industrial control. The communication protocol processing module is coupled to the at least one processor, and is configured to process network traffic of the first operating system and the second operating system according to a synchronized time. The first operating system and the second operating system perform time synchronization through a time message to obtain the synchronized time.

An embodiment of the present invention further discloses a time synchronization method of a network device for industrial control. The time synchronization method includes operating a first operating system to process data forwarding with TSN standards; operating a second operating system to operate with an industrial protocol to process industrial control; performing time synchronization between the first operating system and the second operating system to obtain a synchronized time through a time message; and processing network traffic of the first operating system and the second operating system according to a the synchronized time.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
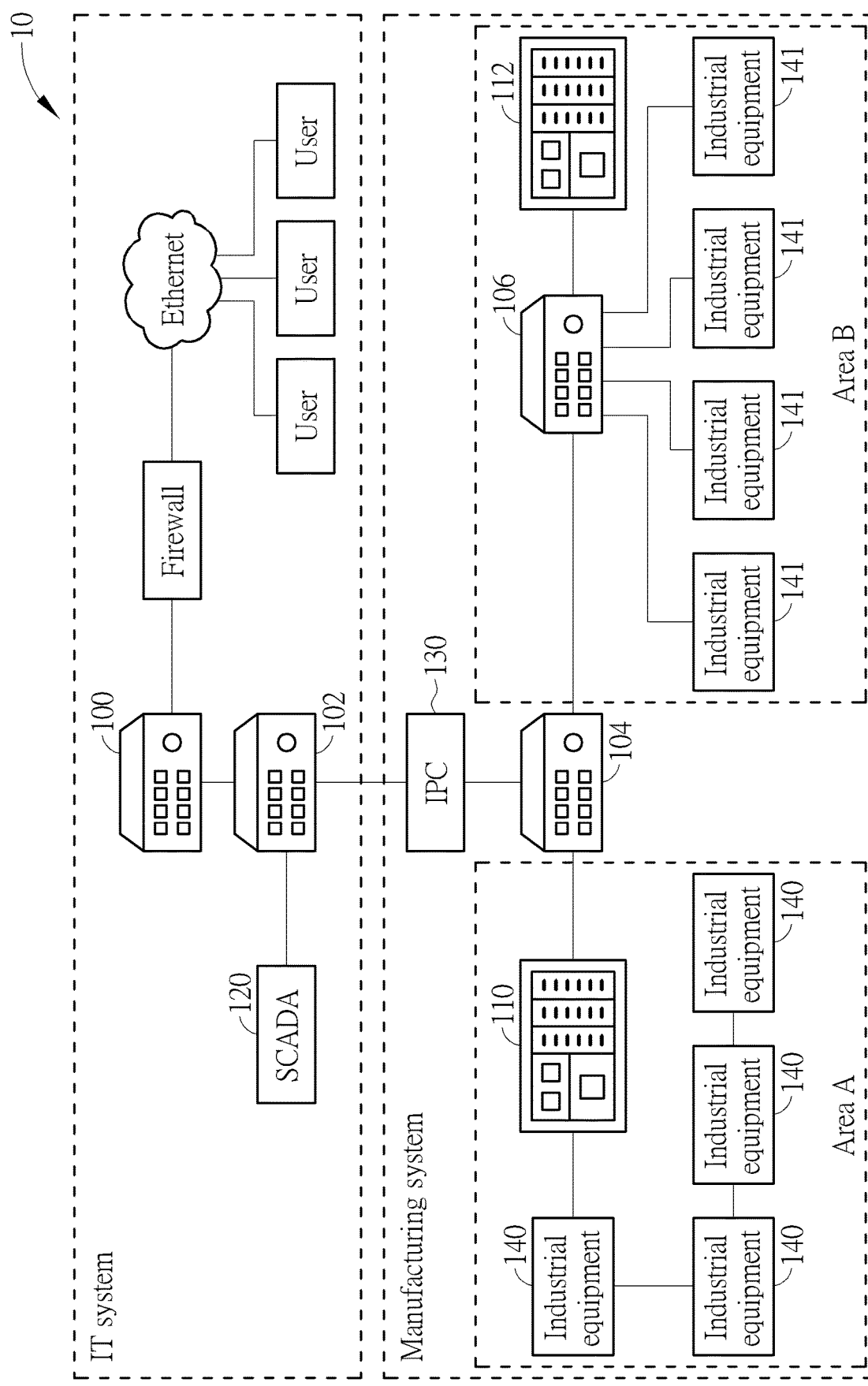
FIG. 1 is a schematic diagram of an industrial network system.

Please refer to FIG. 1, which is a schematic diagram of a simplified industrial network system 10. The industrial network system 10 may comprise a plurality of network switches 100-106, a plurality of industrial controllers 110-112, a supervisory control and data acquisition (SCADA) 120, an industrial PC (IPC) 130 for edge-computing, and a plurality of equipment 140-141. As shown in FIG. 1, the whole industrial network system 10 may be connected by the network switches 100-106 complying with TSN technology. Through the network switches 100-106, information technology (IT) and manufacturing systems may be connected, and furthermore, different areas A and B with a plurality of industrial controllers and industrial equipments may be connected either.

In area A, the industrial controller 110 and the plurality of equipment 140 controlled thereby may be a chain network and connect to the industrial network system 10 through the network switch 104. In area B, the industrial controller 112 and the plurality of equipment 141 controlled thereby may be respectively connect to the industrial network system 10 through the network switch 106. In general, the industrial controller and the equipment controlled or monitored thereby may operate with a specific industrial protocol such as EtherCAT, CC-Link IE, PROFINET, EtherNet/IP, where the time may be controlled by the industrial controller. Through the TSN switches, the controller and the equipment with the specific industrial protocol are able to be compatible to the industrial network system 10.

Therefore, the present invention provides a network device that implements both a network switch and an industrial controller, which combines the data forwarding function of the network switch with the controlling function of the industrial controller. In other words, the network device combines the TSN standards and specific industrial protocols in a single device.

Figure 2:
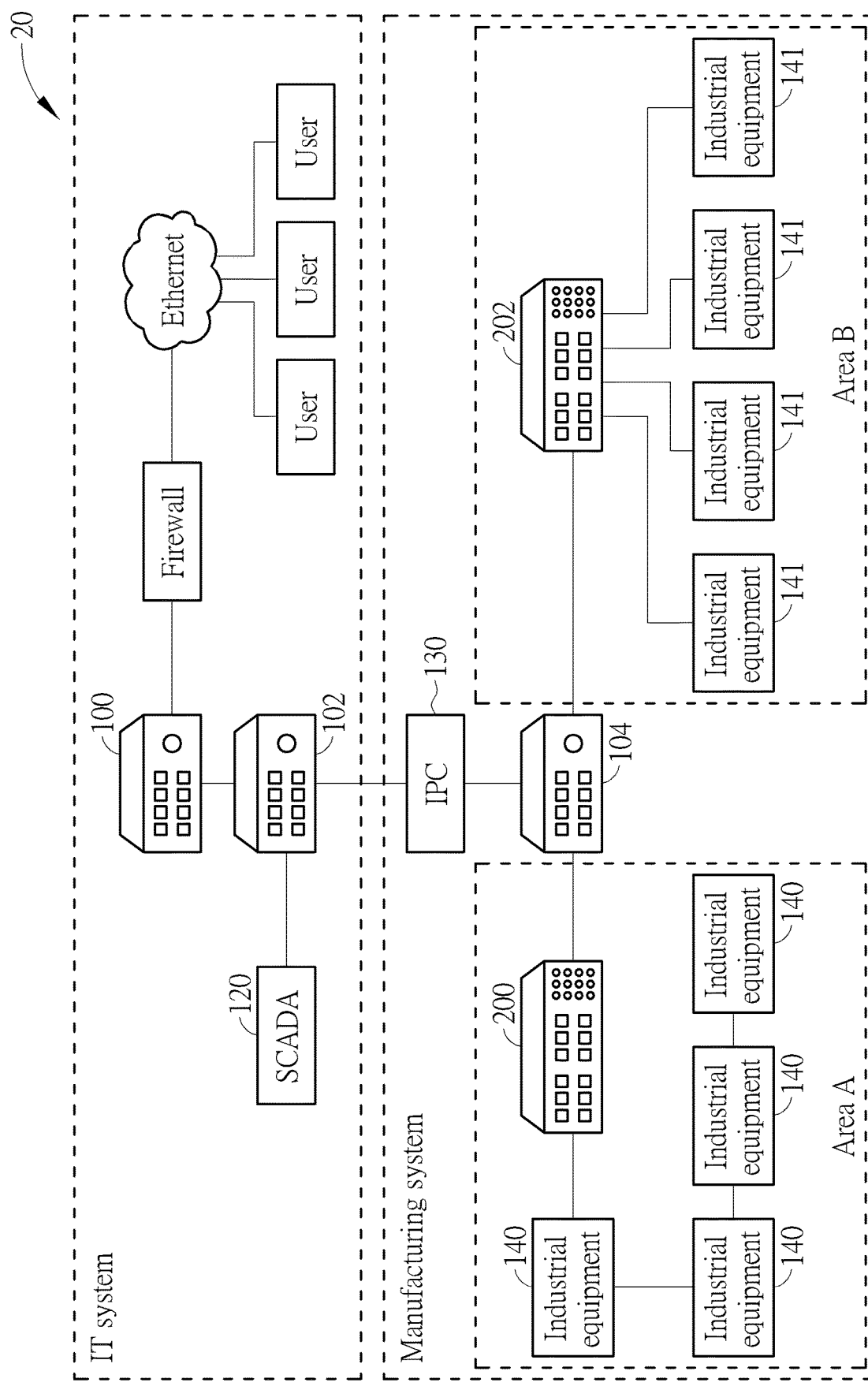
FIG. 2 is a schematic diagram of an industrial network system according to an embodiment of the present invention.

Please refer to FIG. 2, which is a schematic diagram of an industrial network system 20 according to an embodiment of the present invention. The industrial network system 20 is derived from the industrial network system 10, and the same elements are denoted by the same symbols. Compared to the industrial network system 10, in FIG. 2, network devices 200 and 202 replace the proprietary industrial controller such as the industrial controllers 110 and 112 shown in FIG. 1. Specifically, the industrial controller 110 in FIG. 1 is replaced by the network device 200, and the network switch 106 and the industrial controller 112 in FIG. 1 are replaced by the network device 202. In addition to processing data forwarding, the network device 200 also processes industrial control to the industrial equipment 140. Similarly, in addition to processing data forward, the network device 202 also processes industrial control to the industrial equipment 141. In comparison with the industrial network system 10, the network devices 200 and 202 of the industrial network system 20 may be closer to the industrial equipment in the field. Furthermore, the number of devices may be further reduced such as the scenario in the area B.

Figure 3:
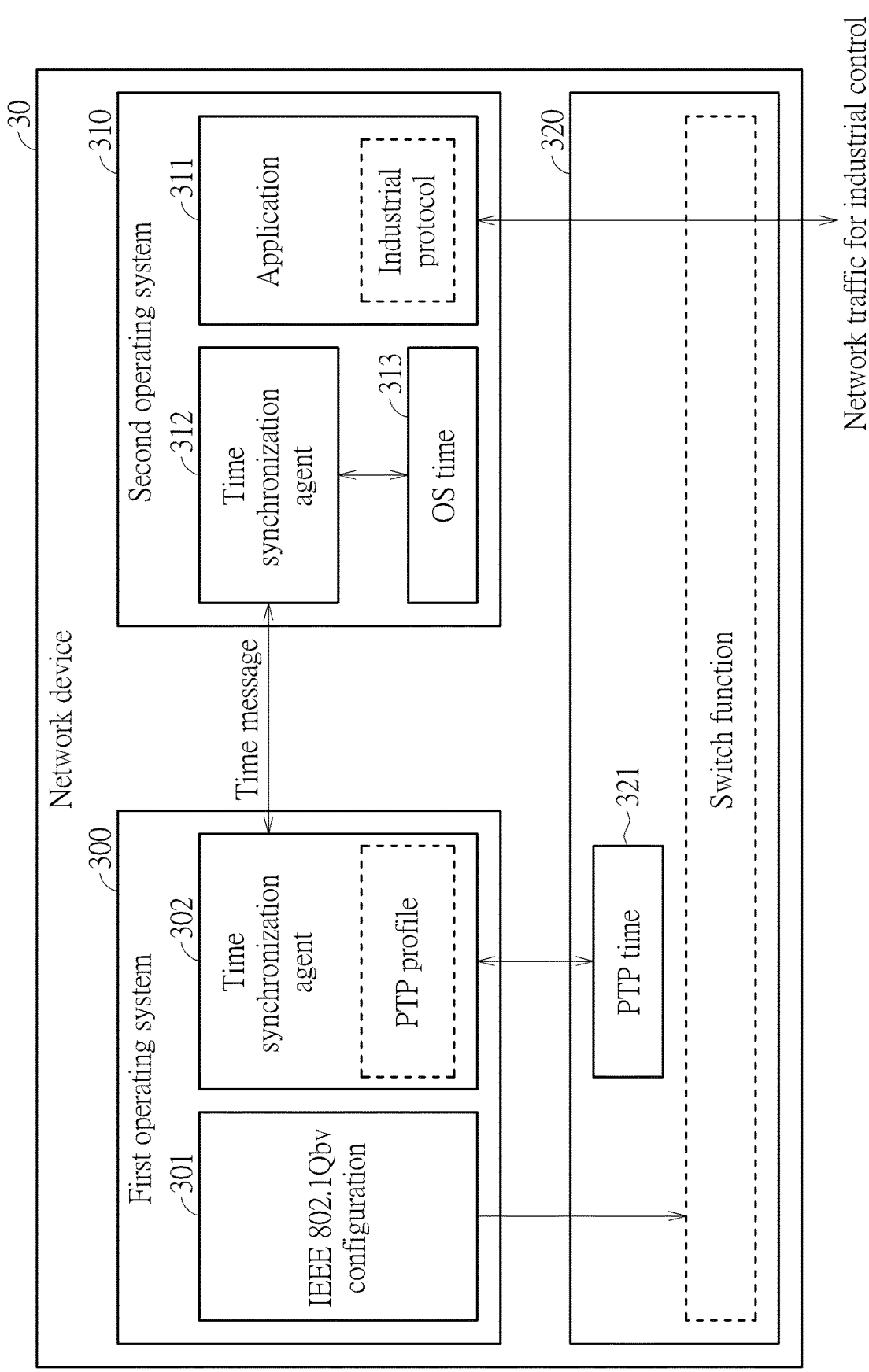
FIG. 3 is a schematic diagram of a logical architecture of a network device according to an embodiment of the present invention.

Please refer to FIG. 3, which is a schematic diagram of a logical architecture of a network device 30 according to an embodiment of the present invention. The network device 30 may be used to implement the network devices 200 and 202 of the industrial network system 20. As shown in FIG. 3, the network device 30 comprises a first operating system 300, a second operating system 310 and a communication protocol processing module 320. The first operating system 300 operates according to TSN standards and is responsible for processing data forwarding. The second operating system 310 comprises an application 311 operating with a specific industrial protocol such as EtherCAT, CC-Link IE, PROFINET, EtherNet/IP to process industrial control for industrial equipment. The communication protocol processing module 320 is configured to process network traffic of the first operating system 300 and the second operating system 310 according to switch functions such as IEEE 802.1Qbv, virtual local area network (VLAN), static MAC address table. In other words, through the communication protocol processing module 320, the first operating system 300 processes the data forwarding as a network switch, and the second operating system 310 processes the industrial control as an industrial controller.

It should be noted that, the network device 30 consists of two operating systems, and runs as both the network switch and the industrial controller, but has only one unique MAC address and IP address. In other words, to the external world, the network device 30 is a single machine. The communication protocol processing module 320 may need to process the network traffic of both of the network switch and the industrial controller, and therefore the first operating system 300 and the second operating system 310 should have consistent time, so that the communication protocol processing module 320 may be able to precisely control the sending of packets. Thus, the present invention provides a time synchronization method of the network device 30 for industrial control.

Specifically, the first operating system 300 and the second operating system 310 perform time synchronization with each other through a time message to obtain a synchronized time, and the time message may at least comprise a time and a frequency. In detail, the time synchronization may be implemented by a time synchronization agent 302 of the first operating system 300 and a time synchronization agent 312 of the second operating system 310 as shown in FIG. 3. The first operating system 300 may be regard as a network switch operating according to the TSN standards, and consequently the first operating system 300 is capable of synchronizing time with the other devices of the industrial network system 20 according to a Precision Time Protocol (PTP) profile such as IEEE 1588 profile, Power Profile (IEEE Std C37.238), Telecom Profile (ITU-T G. 8265.1) or generalized Precision Time Protocol (gPTP, IEEE Std 802.1AS). The time synchronization agent 302 is responsible for synchronizing time with the industrial network system 20 according to the PTP profile and sharing time with the second operating system 310 through the time message. On the other hand, the time synchronization agent 312 is responsible for setting or getting an OS time 313 of the second operating system 310 and sharing time with the first operating system 300 through the time message. Furthermore, the OS time 313 may be determined according to a physical hardware clock of the network device 30 or obtained according to time synchronization mechanisms for industrial protocols such as distributed clocks (DC) for EtherCAT, Common Industrial Protocol sync (CIP Sync) for Ethernet/IP, PROFINET Time Communication Protocol (PTCP) for PROFINET, distributed clocks for POWERLINK or Sercos (serial real-time communication system) time protocol for Sercos III.

Figure 4:
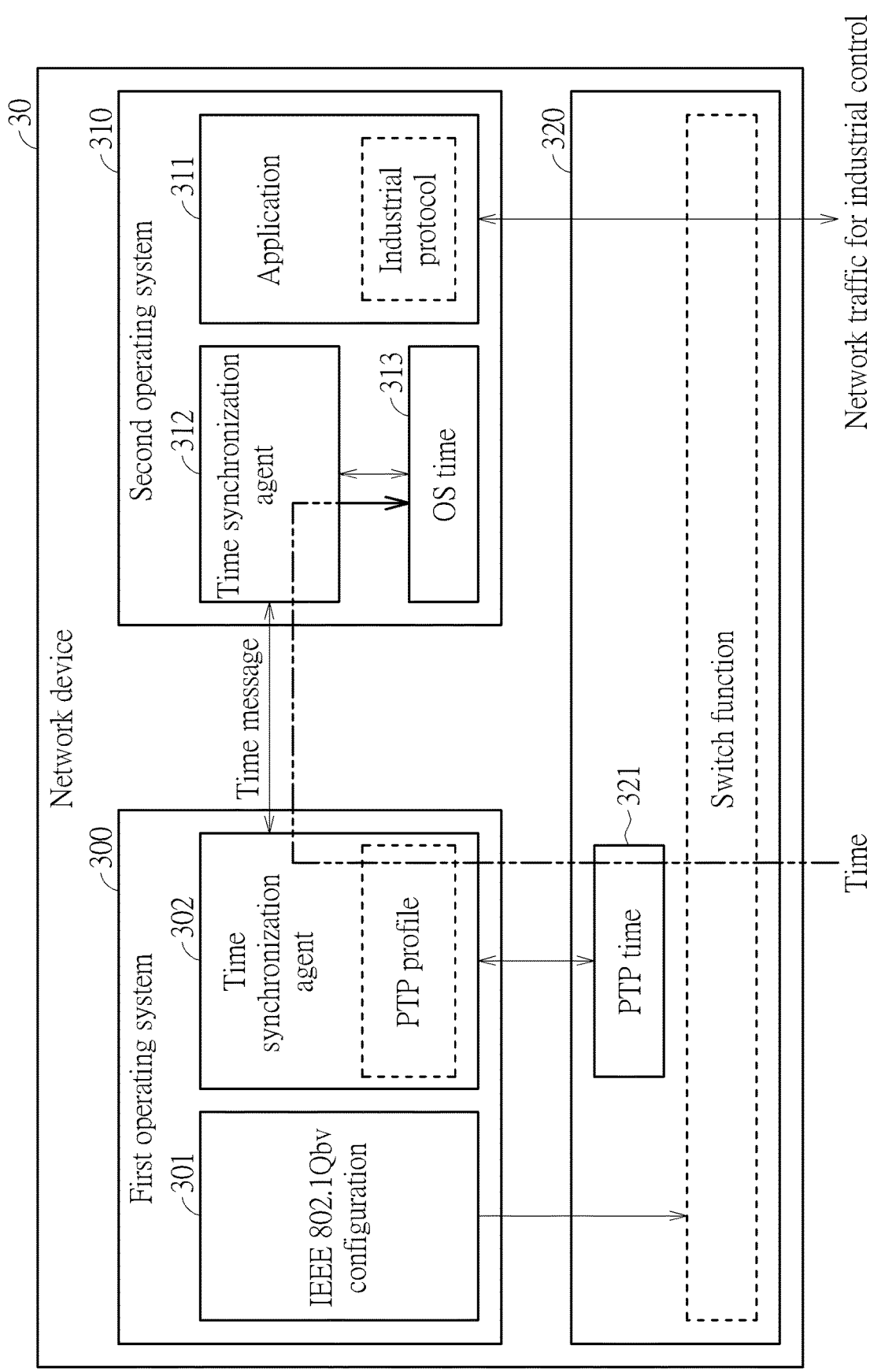
FIG. 4 is a schematic diagram of time synchronization between two operating systems according to an embodiment of the present invention.

In an embodiment, the network device 30 synchronizes time with the industrial network system 20 as shown in FIG. 4. First, the time synchronization agent 302 synchronizes the time of first operating system 300 with the industrial network system 20. Then, the time synchronization agent 302 sends the time message comprising the time and the frequency determined according to the PTP profile to the second operating system 310. Finally, the time synchronization agent 312 of the second operating system 310 receives the time message and sets the OS time 313 of the second operating system 310 accordingly.

Figure 5:
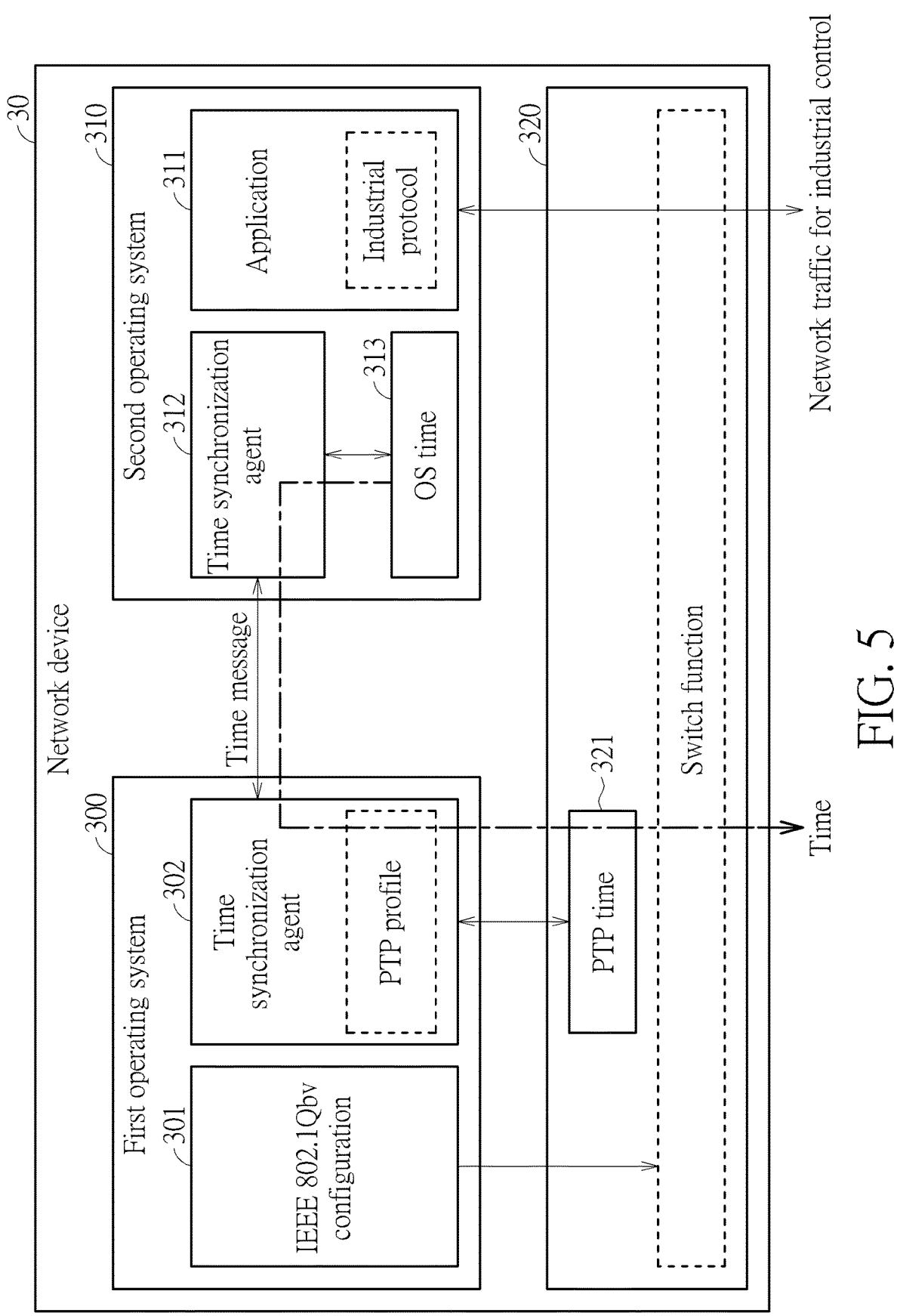
FIG. 5 is a schematic diagram of time synchronization between two operating systems according to an embodiment of the present invention.

In another embodiment, the industrial network system 20 may synchronize time with the network device 30 as shown in FIG. 5. First, the time synchronization agent 312 obtains the OS time 313 of the second operating system 310. Then, the time synchronization agent 312 sends the time message comprising the obtained time and frequency to the first operating system 300. The time synchronization agent 302 of the first operating system 300 receives the time message and adjusts the time thereof accordingly. Finally, the adjusted time is sent to the industrial network system 20 by the time synchronization agent 302 according to the PTP profile. In this embodiment, the OS time 313 may be determined according to a physical hardware clock of the network device 30 or obtained according to time synchronization mechanisms for industrial protocols such as distributed clocks for EtherCAT, CIP Sync for Ethernet/IP, PTCP for PROFINET, distributed clocks for POWERLINK or Sercos time protocol for Sercos III.

Accordingly, the first operating system 300 and the second operating system 310 may have the synchronized time. According to the synchronized time, the communication protocol processing module 320 is capable of precisely processing data forwarding of the first operating system 300 and the network traffic for industrial control of the second operating system 310.

In an embodiment, the first operating system 300 may adopt Linux, the second operating system 310 may adopt real-time operating system (RTOS), and the communication therebetween may be realized through a memory block, and are not limited thereto. For example, the exchange of the time messages between the two operating systems may implement through memory management unit (MMU) or direct memory access (DMA) technologies. Those skilled in the art may make various modifications and adjustments accordingly.

Figure 6:
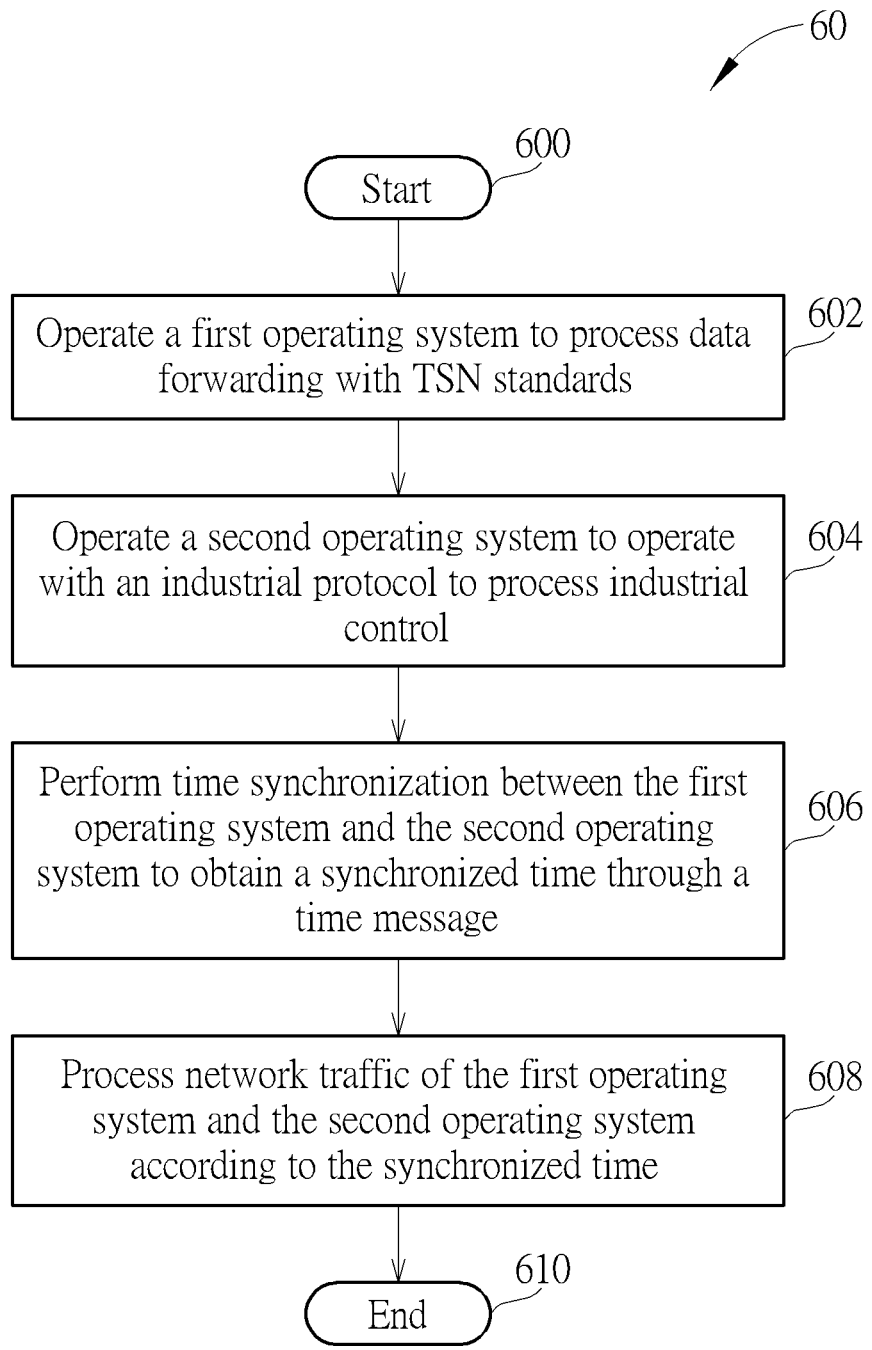
FIG. 6 is a schematic diagram of a time synchronization process according to an embodiment of the present invention.

The above time synchronization method executed by the network device 30 may be summarized into a process 60 as shown in FIG. 6. The process 60 comprises the following steps:

Step 600: Start.

Step 602: Operate a first operating system to process data forwarding with TSN standards.

Step 604: Operate a second operating system to operate with an industrial protocol to process industrial control.

Step 606: Perform time synchronization between the first operating system and the second operating system to obtain a synchronized time through a time message.

Step 608: Process network traffic of the first operating system and the second operating system according to the synchronized time.

Step 610: End.

Figure 7:
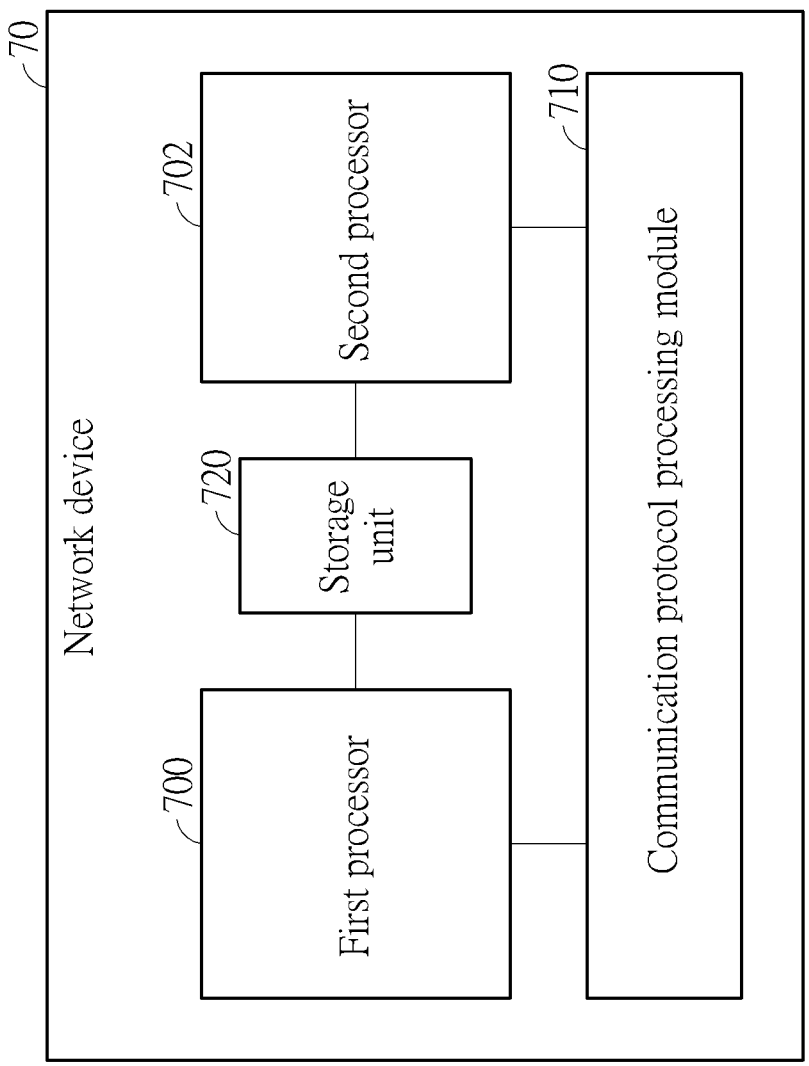
FIG. 7 is a schematic diagram of a network device according to an embodiment of the present invention.

Furthermore, please refer to FIG. 7, which is a schematic diagram of a network device 70 according to an embodiment of the present invention. The network device 70 is used to implement the network devices 30, 200 and 202. As shown in FIG. 7, the network device 70 may comprise a first processor 700, a second processor 702, a communication protocol processing module 710 and a storage unit 720. The communication protocol processing module 710 is coupled to the first processor 700 and the second processor 702, and the storage unit 720 is coupled to the first processor 700 and the second processor 702. The first processor 700 and the second processor 702 may be a general-purpose processor, a microprocessor or an application-specific integrated circuit (ASIC). The communication protocol processing module 710 may be a media access control (MAC) chip used for processing L2 traffic and is not limited thereto. The storage unit 720 may be any type of data storage devices for storing the first operating system 300 and the second operating system 310, and the first operating system 300 and the second operating system 310 are read and executed by the first processor 700 and the second processor 702. For example, the storage unit 720 may be a read-only memory (ROM), a flash memory, a random-access memory (RAM), a hard disk, an optical data storage device, a non-volatile storage unit, etc., and is not limited thereto.

The network device 70 is used to represent the necessary components required to implement the embodiments of the present invention, and those skilled in the art may make various modifications and adjustments accordingly, and is not limited to this. For example, one of the first processor 700 and the second processor 702 may run the first operating system 300 for data forwarding, and the other may run the second operating system 310 for industrial control. Furthermore, the communication between the first operating system 300 and the second operating system 310 may be implemented through management ports (MGMT ports) of the communication protocol processing module 710 and is not limited thereto.

Figure 8:
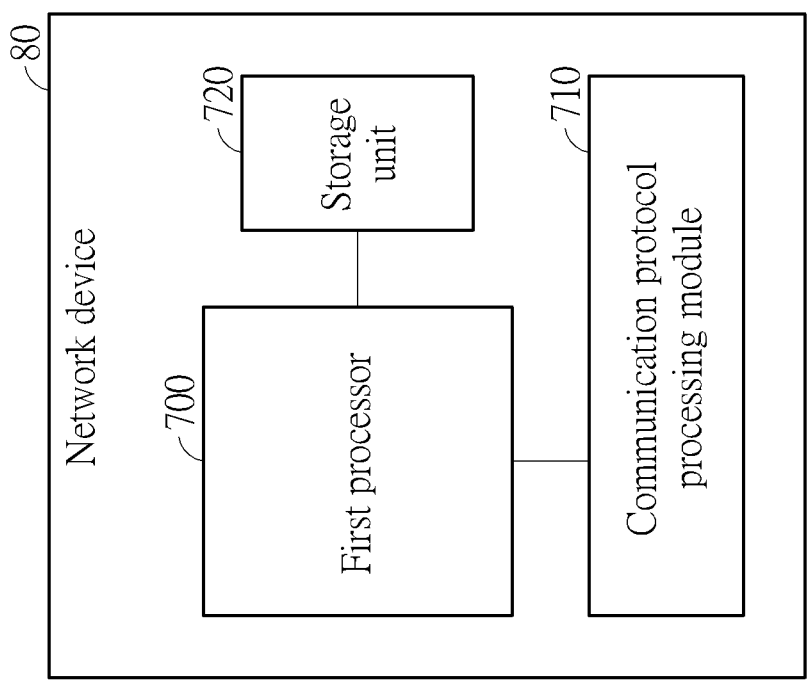
FIG. 8 is a schematic diagram of a network device according to an embodiment of the present invention.

Please refer to FIG. 8, which is a schematic diagram of a network device 80 according to an embodiment of the present invention. The network device 80 is another implementation for the network device of the present invention and may be used to implement the network devices 30, 200 and 202. As shown in FIG. 8, the network device 80 may comprise a first processor 700, a communication protocol processing module 710 and a storage unit 720, where the first processor 700 is coupled to the communication protocol processing module 710 and the storage unit 720. In comparison with the network device 70, the network device 80 has merely one processor and may operate both the first operating system 300 and the second operating system 310 on the same processor simultaneously through virtual machine technology.

It should be noted, in all of the above embodiments, two operating systems run on the same or two different processors and synchronize time therebetween through the time message. However, the present invention is not limited to the number of the operating systems and the processors, and those skilled in the art may adopt any number of operating systems and processors to meet actual needs.

In summary, the present invention provides a network device with multiple operating systems and a time synchronization method thereof for industrial control, which combine a network switch and an industrial controller into one so as to enhance the flexibility of industrial network layouts and facilitate industrial control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network device for industrial control, comprising:
   at least one processor, configured to operate a first operating system (OS) to process data forwarding with Time-Sensitive Networking (TSN) standards and operate a second operating system to operate with an industrial protocol to process industrial control; and
   a communication protocol processing module, coupled to the at least one processor, configured to process network traffic of the first operating system and the second operating system according to a synchronized time;
   wherein the first operating system and the second operating system perform time synchronization through a time message to obtain the synchronized time.

2. The network device of claim 1, wherein the first operating system and the second operating system are operated on different processors of the at least one processor.

3. The network device of claim 1, wherein the first operating system and the second operating system are operated on the same processor of the at least one processor through virtual machine technology.

4. The network device of claim 1, wherein the time message comprises a time and a frequency.

5. The network device of claim 1, wherein the first operating system obtains external time according to a precision time protocol (PTP) profile, sends the time message to the second operating system according to the external time, and the second operating system sets OS time of the second operating system based on the time message.

6. The network device of claim 1, wherein the second operating system obtains OS time of the second operating system, sends the time message to the first operating system according to the OS time, and the first operating system synchronizes time based on the time message according to a PTP profile.

7. The network device of claim 6, wherein the OS time is obtained according to a physical hardware clock of the network device.

8. The network device of claim 6, wherein the OS time is obtained according to an industrial protocol.

9. The network device of claim 8, wherein the industrial protocol is one of the following:
   distributed clocks (DC) for Ethernet for Control Automation Technology (EtherCAT);
   Common Industrial Protocol sync (CIP Sync) for Ethernet/IP;
   PROFINET Time Communication Protocol (PTCP) for PROFINET;
   distributed clocks for POWERLINK; and
   serial real-time communication system (Sercos) time protocol for Sercos III.

10. A time synchronization method of a network device for industrial control, comprising:
   operating a first operating system (OS) to process data forwarding with Time-Sensitive Networking (TSN) standards;
   operating a second operating system to operate with an industrial protocol to process industrial control;
   performing time synchronization between the first operating system and the second operating system to obtain a synchronized time through a time message; and
   processing network traffic of the first operating system and the second operating system according to the synchronized time.

11. The time synchronization method of claim 10, wherein the time message comprises a time and a frequency.

12. The time synchronization method of claim 10, wherein the first operating system obtains external time according to a precision time protocol (PTP) profile, sends the time message to the second operating system according to the external time, and the second operating system set OS time of the second operating system based on the time message.

13. The time synchronization method of claim 10, wherein the second operating system obtains OS time of the second operating system, sends the time message to the first operating system according to the OS time, and the first operating system synchronize time based on the time message according to a PTP profile.

14. The time synchronization method of claim 13, wherein the OS time is obtained according to a physical hardware clock of the network device.

15. The time synchronization method of claim 13, wherein the OS time is obtained according to an industrial protocol.

16. The time synchronization method of claim 15, wherein the industrial protocol is one of the following:
   distributed clocks (DC) for Ethernet for Control Automation Technology (EtherCAT);
   Common Industrial Protocol sync (CIP Sync) for Ethernet/IP;
   PROFINET Time Communication Protocol (PTCP) for PROFINET;
   distributed clocks for POWERLINK; and
   serial real-time communication system (Sercos) time protocol for Sercos III.

* * * * *